United States Patent
Ok et al.

(10) Patent No.: US 8,742,043 B2
(45) Date of Patent: Jun. 3, 2014

(54) TRANSITION METAL CATALYTIC SYSTEMS AND METHODS FOR PREPARING ETHYLENE HOMOPOLYMERS OR COPOLYMERS OF ETHYLENE AND OLEFINS USING THE SAME

(75) Inventors: Myung Ahn Ok, Daejeon (KR); Dae Ho Shin, Daejeon (KR); Jong Sok Hahn, Daejeon (KR); Ho Seong Lee, Daejeon (KR); Sang Ook Kang, Seoul (KR); Sung Kwan Kim, Gyeongsangnam-do (KR)

(73) Assignee: SK Innovation Co., Ltd., Seoul (KR)

(*) Notice: Subject to any disclaimer, the term of this patent is extended or adjusted under 35 U.S.C. 154(b) by 778 days.

(21) Appl. No.: 12/312,278

(22) PCT Filed: Oct. 30, 2007

(86) PCT No.: PCT/KR2007/005393
§ 371 (c)(1),
(2), (4) Date: May 1, 2009

(87) PCT Pub. No.: WO2008/054117
PCT Pub. Date: May 8, 2008

(65) Prior Publication Data
US 2010/0048840 A1    Feb. 25, 2010

(30) Foreign Application Priority Data
Nov. 1, 2006 (KR) .......... 10-2006-0107209
Oct. 23, 2007 (KR) .......... 10-2007-0106674

(51) Int. Cl.
C08F 4/6592 (2006.01)
C08F 4/642 (2006.01)
C08F 4/643 (2006.01)
C08F 110/02 (2006.01)
C07F 17/00 (2006.01)

(52) U.S. Cl.
USPC .......... 526/161; 526/131; 526/133; 526/160; 526/165; 526/943; 502/103; 502/155; 556/56

(58) Field of Classification Search
USPC ............ 556/56; 502/103, 155; 526/131, 133, 526/160, 161, 165, 943, 352
See application file for complete search history.

(56) References Cited

U.S. PATENT DOCUMENTS

| | | | |
|---|---|---|---|
| 4,752,597 | A | 6/1988 | Turner |
| 5,043,408 | A | 8/1991 | Kakugo et al. |
| 5,079,205 | A | 1/1992 | Canich |
| 5,103,030 | A | 4/1992 | Rohrmann et al. |
| 5,198,401 | A | 3/1993 | Turner et al. |
| 6,329,478 | B1 | 12/2001 | Katayama et al. |

FOREIGN PATENT DOCUMENTS

| | | |
|---|---|---|
| EP | 0420436 | 8/1996 |
| EP | 0416815 | 8/1997 |
| EP | 0842939 | 7/2004 |
| JP | 63-092621 | 4/1988 |
| JP | 08208732 | 8/1996 |
| JP | 2002212218 | 7/2002 |
| KR | 1020010074722 | 9/2001 |

OTHER PUBLICATIONS

International Search Report of International Application No. PCT/KR2007/005393 dated Jan. 30, 2008.
Nomura et al.; "Synthesis of Nonbridged (Anilide) (cyclopentadienyl) titanium (IV) Complexes of the Type Cp"TiCI2[N(2,6-Me2C6H3)(R)] and Their Use in Catalysis for Olefin Polymerization; Organometallics 2002, 21, 3042-3049.
James C. Randall; "A Review of High Resolution Liquid 13 Carbon Nuclear Magnetic Resonance Characterizations of Ethylene-Based Polymers"; JMS-Rev. Macromol, Chem. Phys., C29(2 &3), 201-317 (1989).

*Primary Examiner* — Caixia Lu
(74) *Attorney, Agent, or Firm* — Abelman, Frayne & Schwab

(57) ABSTRACT

Disclosed herein is a group IV transition metal catalyst for producing an ethylene homopolymer or an ethylene-olefin copolymers, having high catalytic activity, which includes a cyclopentadiene derivative and one or more anionic ligands having an aryl group substituted with an aryl derivative at an ortho-position thereof around a transition metal, the ligands not being crosslinked to each other, a catalyst system including the group IV transition metal catalyst and an aluminoxane cocatalyst or a boron compound cocatalyst, and a method of producing ethylene homopolymers or ethylene-olefin copolymers using the catalyst system.

11 Claims, No Drawings

US 8,742,043 B2

TRANSITION METAL CATALYTIC SYSTEMS AND METHODS FOR PREPARING ETHYLENE HOMOPOLYMERS OR COPOLYMERS OF ETHYLENE AND OLEFINS USING THE SAME

TECHNICAL FIELD

The present invention relates to a transition metal catalyst system for producing an ethylene homopolymer or copolymers of ethylene and olefins, and, more particularly, to a group IV transition metal catalyst which includes a cyclopentadiene derivative and one or more anionic ligands having an aryl group substituted with an aryl derivative at an ortho-position thereof around a transition metal, the ligands not being crosslinked to each other, a catalyst system including the group IV transition metal catalyst and an aluminoxane co-catalyst or a boron compound co-catalyst, and a method of producing ethylene homopolymer or copolymers ethylene and olefins using the catalyst system.

BACKGROUND ART

Conventionally, a Ziegler-Natta catalyst system, including a main catalyst component of titanium or vanadium compounds and a cocatalyst component of alkylaluminum compounds, has been used to produce an ethylene homopolymer or copolymers of ethylene and α-olefins. However, the Ziegler-Natta catalyst system is disadvantageous in that, even though it is highly active in the polymerization of ethylene, the molecular weight distribution of resultant polymers is wide, and particularly, the compositional distribution in the copolymers of ethylene and α-olefins is non-uniform due to heterogeneous catalyst active sites.

Recently, a so-called metallocene catalyst system, including a metallocene compound of a group IV transition metal in the periodic table of the elements, such as titanium, zirconium, hafnium, or the like, and methylaluminoxane, which is a co-catalyst, has been developed. The metallocene catalyst system is a homogeneous catalyst system having single catalytic active-site, and is characterized in that the metallocene catalyst system can be used to produce polyethylene having a narrow molecular weight distribution and a uniform composition distribution, compared to the conventional Ziegler-Natta catalyst system. For example, it was disclosed in European Patent Publication No. 320762 and Japanese Patent Publication No. Sho63-092621 that a metallocene compound, such as $Cp_2TiCl_2$, $Cp_2ZrCl_2$, $Cp_2ZrMeCl$, $Cp_2ZrMe_2$, ethylene$(IndH_4)_2ZrCl_2$, or the like, is activated using methylaluminoxane, which is a co-catalyst, so that ethylene is very actively polymerized, thereby producing polyethylene having a molecular weight distribution (Mw/Mn) ranging from 1.5 to 2.0. However, in the metallocene catalyst system disclosed in the patent documents, it is known that it is difficult to produce a polymer having a high molecular weight using the metallocene catalyst system, that the polymerization activity of the metallocene catalyst system is rapidly decreased and the β-hydride elimination of ethylene is accelerated when the metallocene catalyst system is applied to a solution polymerization method, which is carried out at a high temperature of 140° C. or more, and thus the metallocene catalyst system is not suitable for use in the production of a high molecular weight polymer having a weight-average molecular weight of 100,000 or more.

Meanwhile, a constrained geometry non-metallocene catalyst (a so-called single-site catalyst) in which a transition metal is connected to a ring shape ligand system has been suggested as a catalyst which has a high catalytic activity and is capable of producing a polymer having a high molecular weight in polymerization of only ethylene or in copolymerization of ethylene and a-olefins under solution polymerization condition. European Patent Nos. 0416815 and 0420436 disclose a constrained geometry non-metallocene catalyst in which one cyclopentadiene ligand is bonded with amide groups in a ring shape, and European Patent No. 0842939 discloses a constrained geometry non-metallocene catalyst in which phenol-based ligands, which are electron-donating compounds, are bonded with cyclopentadiene ligands in a ring shape. However, such constrained geometry non-metallocene catalysts are very difficult to use commercially because the yield of a process of cyclization along the transition metal with ligands during the synthesis of the constrained geometry non-metallocene catalyst is very low.

Meanwhile, U.S. Pat. No. 6,329,478 and Korean Patent Publication No. 2001-74722 disclose a non-metallocene catalyst, which is not a constrained geometry catalyst. It can be seen in these patent documents that a single-site catalyst, produced using at least one phosphine-imine compound as a ligand, exhibits a high conversion of ethylene in copolymerization of ethylene and α-olefin under a solution polymerization condition at above 140° C. Further, U.S. Pat. No. 5,079,205 discloses a non-metallocene catalyst including a bis-phenoxide ligand, and U.S. Pat. No. 5,043,408 discloses a non-metallocene catalyst including a chelated bis-phenoxide ligand. However, such non-metallocene catalysts are very difficult to use commercially to produce an ethylene homopolymer or an ethylene-α-olefin copolymer at high temperatures because they have very low catalytic activity.

Furthermore, Japanese Patent Publication Nos. 1996-208732 and 2002-212218 disclose an anilido ligand as an olefin polymerization catalyst, but nowhere is the use of the olefin polymerization catalyst within a commercially useful polymerization temperature range mentioned therein. In addition, the olefin polymerization catalyst is different in structure from the transition metal catalyst, disclosed in the present invention, including an anilido ligand having an aryl substituent at the ortho position thereof. Furthermore, In addition, it was reported in the paper [*Organometallics* 2002, 21, 3043, Nomura et al.] describes an anilido ligand as a non-metallocene catalyst for use in polymerization, but the substituent at the ortho position is limited only to the most simple alkyl, methyl.

DISCLOSURE

Technical Problem

In order to overcome the above problems occurring in the prior art, the present inventors have conducted extensive research, resulting in finding that non-crosslinked type transition metal catalysts, including a cyclopentadiene derivative and one or more anionic ligands having an aryl group substituted with an aryl derivative at an ortho-position thereof, exhibit excellent catalytic activity in the polymerization of ethylene and olefins. Based on the finding, the present inventors have developed catalysts which can be used to produce an ethylene homopolymer and ethylene-olefin copolymers having a high molecular weight at high activity during a solution polymerization process performed at high temperatures of 60° C. or more, thereby accomplishing the present invention.

Accordingly, the present invention provides a single-site catalyst which can be economically synthesized due to a simple synthetic scheme and which has high activity in the polymerization of olefins. Further, the present invention provides a polymerization method which can be used to economically produce ethylene homopolymer or ethylene-olefin copolymers having various physical properties from a commercial viewpoint, using the single-site catalyst.

Technical Solution

An aspect of the present invention provides a group IV transition metal catalyst, represented by Formula 1 below, which includes a cyclopentadiene derivative and one or more anionic ligands having an aryl group substituted with an aryl derivative at the ortho-position thereof around a group IV transition metal, the ligands not being crosslinked to each other.

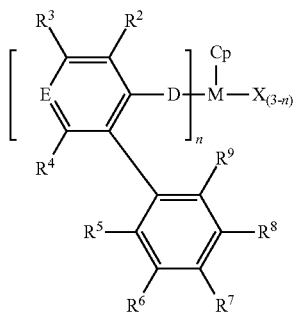

[Formula 1]

In Formula 1, M is a group IV transition metal in a periodic table;

Cp is a cyclopentadienyl anion which can form an $\eta^5$-bond along with a central metal, or derivatives thereof;

D is N—$R^1$, P—$R^1$ or a sulfur atom, in which $R^1$ is a hydrogen atom, a linear or nonlinear alkyl group of 1 to 20 carbon atoms, a silyl group including a linear or nonlinear alkyl group of 1 to 20 carbon atoms, an aryl group of 6 to 30 carbon atoms, an arylalkyl group of 7 to 30 carbon atoms, an alkoxy group including a linear or nonlinear alkyl group of 1 to 20 carbon atoms, or a siloxy group substituted with an alkyl group of 1 to 20 carbon atoms or an aryl group of 6 to 20 carbon atoms;

$R^2$, $R^3$, $R^4$, $R^5$, $R^6$, $R^7$, $R^8$ and $R^9$ are each independently a hydrogen atom, a halogen atom, a linear or nonlinear alkyl group of 1 to 20 carbon atoms, a linear or nonlinear alkyl group of 1 to 20 carbon atoms arbitrarily substituted with one or more halogen atoms, a silyl group including a linear or nonlinear alkyl group of 1 to 20 carbon atoms, an aryl group of 6 to 30 carbon atoms, an arylalkyl group of 7 to 30 carbon atoms, an alkoxy group including an alkyl group of 1 to 20 carbon atoms substituted with one or more halogen atoms, a siloxy group substituted with an alkyl group of 1 to 20 carbon atoms or an aryl group of 6 to 20 carbon atoms, an amido group or a phosphido group including a hydrocarbon group of 1 to 20 carbon atoms, or a mercapto group or a nitro group substituted with an alkyl group of 1 to 20 carbon atoms, and $R^2$, $R^3$, $R^4$, $R^5$, $R^6$, $R^7$, $R^8$ and $R^9$ may be arbitrarily bonded with each other to form rings;

E is a nitrogen atom or C—$R^{10}$, in which $R^{10}$ is a hydrogen atom, a halogen atom, a linear or nonlinear alkyl group of 1 to 20 carbon atoms, a linear or nonlinear alkyl group of 1 to 20 carbon atoms arbitrarily substituted with one or more halogen atoms, a silyl group including a linear or nonlinear alkyl group of 1 to 20 carbon atoms, an aryl group of 6 to 30 carbon atoms, an arylalkyl group of 7 to 30 carbon atoms, an alkoxy group including an alkyl group of 1 to 20 carbon atoms, a siloxy group substituted with an alkyl group of 3 to 20 carbon atoms or an aryl group of 6 to 20 carbon atoms, an amido group or a phosphido group including a hydrocarbon group of 1 to 20 carbon atoms, or a mercapto group or a nitro group substituted with an alkyl group of 1 to 20 carbon atoms;

n is an integer of 1 or 2; and

X may be selected from the group consisting of a halogen atom, an alkyl group of 1 to 20 carbon atoms, which is not a cyclopentadiene derivative, an arylalkyl group of 7 to 30 carbon atoms, an alkoxy group including an alkyl group of 1 to 20 carbon atoms, a siloxy group substituted with an alkyl group of 3 to 20 carbon atoms, and an amido group including a hydrocarbon group of 1 to 20 carbon atoms.

Another aspect of the present invention provides a transition metal catalyst system including the transition metal catalyst, and an aluminoxane or boron compound catalyst.

Still another aspect of the present invention provides a method of producing an ethylene homopolymer or an ethylene-olefin copolymer using the transition metal catalyst system.

Advantageous Effects

As described above, the transition metal catalyst according to the present invention can be easily produced through economical methods because the synthetic scheme thereof is simple. Further, the transition metal catalyst according to the present invention is more practical than commonly-used metallocene and non-metallocene single-site catalysts because it has a high thermal stability, so that it is easily copolymerized with other olefins while maintaining high catalytic activity at high temperatures, thereby producing high molecular weight polymers at high yield. Therefore, the transition metal catalyst system including the transition metal catalyst according to the present invention can be usefully used to produce ethylene homopolymer or ethylene-olefin copolymers having various physical properties.

BEST MODE

Hereinafter, the present invention will be described in detail.

M in the transition metal catalyst, represented by Formula 1 above, is preferably titanium, zirconium, or hafnium.

Further, Cp is a cyclopentadiene anion which can form an $\eta^5$-bond along with a central metal or a derivative thereof. Specifically, examples of Cp may include cyclopentadienyl, methylcyclopentadienyl, dimethylcyclopentadienyl, tetramethylcyclopentadienyl, pentamethylcyclopentadienyl, butylcyclopentadienyl, sec-butylcyclopentadienyl, tert-butylmethylcyclopentadienyl, trimethylsilylcyclopentadienyl, indenyl, methylindenyl, dimethylindenyl, ethylindenyl, isopropylindenyl, fluorenyl, methylfluorenyl, dimethylfluorenyl, ethylfluorenyl, and isopropylfluorenyl.

D, which exists on an anionic ligand, is N—$R^1$, P—$R^1$ or a sulfur atom. Here, $R^1$ may be a hydrogen atom; a linear or nonlinear alkyl group of 1 to 20 carbon atoms, such as a methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, or n-eicosyl group, and preferably, a methyl group, ethyl group, n-propyl group, isopropyl group, n-butyl group, or tert-butyl group; a silyl group including a linear or nonlinear alkyl group of 1 to 20 carbon atoms, such as a methylsilyl group, ethylsilyl group, phenylsilyl group, dimethylsilyl group, diethylsilyl group, diphenylsilyl group, trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyldimethylsilyl group, tri-n-pentylsilyl group, tri-n-hexylsilyl group, tricyclohexylsilyl group, or triphenylsilyl group, and preferably a trimethylsilyl group, tert-butyldimethylsilyl group, or triphenylsilyl group; an aryl group of 6 to 30 carbon atoms, such as a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, biphenyl group, fluorenyl group, triphenyl group, naphthyl group, or anthracenyl group, and preferably, a phenyl group, naphthyl group, biphenyl group, 2-isopropylphenyl group, 3,5-xylyl group, or 2,4,6-trimethylphenyl group; an arylalkyl group of 7 to 30 carbon atoms, such as a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, or anthracenylmethyl group, and preferably a benzyl group; an alkoxy group including a linear or nonlinear alkyl group of 1 to 20 carbon atoms, such as a methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, or n-eicosoxy group, and preferably, a methoxy group, ethoxy group, isopropoxy group, or tert-butoxy group; or a siloxy group substituted with an alkyl group of 1 to 20 carbon atoms or an aryl group of 6 to 20 carbon atoms, such as a trimethylsiloxy group, triethylsiloxy group, tri-n-propylsiloxy group, triisopropylsiloxy group, tri-n-butylsiloxy group, tri-sec-butylsiloxy group, tri-tert-butylsiloxy group, tri-isobutylsiloxy group, tert-butyldimethylsiloxy group, tri-n-pentylsiloxy group, tri-n-hexylsiloxy group, tricyclohexylsiloxy group, or triphenylsiloxy group, and preferably, a trimethylsiloxy group, tert-butyldimethylsiloxy group, or triphenylsiloxy group.

$R^2$, $R^3$, $R^4$, $R^5$, $R^6$, $R^7$, $R^8$ and $R^9$ may be each independently a hydrogen atom, a halogen atom, a linear or nonlinear alkyl group of 1 to 20 carbon atoms, a linear or nonlinear alkyl group of 1 to 20 carbon atoms arbitrarily substituted with one or more halogen atoms, a silyl group including a linear or nonlinear alkyl group of 1 to 20 carbon atoms, an aryl group of 6 to 30 carbon atoms, an arylalkyl group of 7 to 30 carbon atoms, an alkoxy group including an alkyl group of 1 to 20 carbon atoms substituted with one or more halogen atoms, a siloxy group substituted with an alkyl group of 1 to 20 carbon atoms or an aryl group of 6 to 20 carbon atoms, an amido group or a phosphido group including a hydrocarbon group of 1 to 20 carbon atoms, or a mercapto group or a nitro group substituted with an alkyl group of 1 to 20 carbon atoms. Here, examples of the halogen atom may include fluorine, chlorine, bromine, and iodine atoms; examples of the linear or nonlinear alkyl group of 1 to 20 carbon atoms may include a methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, and n-eicosyl group, and preferably, a methyl group, ethyl group, n-propyl group, isopropyl group, n-butyl group, and tert-butyl group; examples of the alkyl group of 1 to 20 carbon atoms substituted with one or more halogen atoms may include a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, and perbromoeicosyl group, and preferably, a trifluoromethyl group; examples of the silyl group including a linear or nonlinear alkyl group of 1 to 20 carbon atoms may include a methylsilyl group, ethylsilyl group, phenylsilyl group, dimethylsilyl group, diethylsilyl group, diphenylsilyl group, trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyldimethylsilyl group, tri-n-pentylsilyl group, tri-n-hexylsilyl group, tricyclohexylsilyl group, and triphenylsilyl group, and preferably a trimethylsilyl group, tert-butyldimethylsilyl group, and triphenylsilyl group; examples of the aryl group of 6 to 30 carbon atoms may include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, biphenyl group, fluorenyl group, triphenyl group, naphthyl group, and anthracenyl group, and preferably, a phenyl group, naphthyl group, biphenyl group, 2-isopropylphenyl group, 3,5-xylyl group, and 2,4,6-trimethylphenyl group; examples of the arylalkyl group of 7 to 30 carbon atoms may include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, and anthracenylmethyl group, and preferably, a benzyl group; examples of the alkoxy group including an alkyl group of 1 to 20 carbon atoms may include a methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, and n-eicosoxy group, and preferably, a methoxy group, ethoxy group, isopropoxy group, and tert-butoxy group; examples of the siloxy group substituted with an alkyl group of 1 to 20 carbon atoms or an aryl group of 6 to 20 carbon atoms may include a trimethylsiloxy group, triethylsiloxy group, tri-n-propylsiloxy group, triisopropylsiloxy group, tri-n-butylsiloxy group, tri-sec-butylsiloxy group, tri-tert-butylsiloxy group, tri-isobutylsiloxy group, tert-butyldimethylsiloxy group, tri-n-pentylsiloxy group, tri-n-hexylsiloxy group, tricyclohexylsiloxy group, and triphenylsiloxy group, and preferably, a trimethylsiloxy group, tert-butyldimethylsiloxy group, and triphenylsiloxy group; examples of the amido group or phosphido group including a hydrocarbon group of 1 to 20 carbon atoms may include a dimethylamino group, diethylamino group, di-n-propylamino group, diisopropylamino group, di-n-butylamino group, di-sec-butylamino group, di-tert-butylamino group, diisobutylamino group, tert-butylisopropylamino group, di-n-hexylamino group, di-n-octylamino group, di-n-decylamino group, diphenylamino group, dibenzylamide group, methylethylamide group, methylphenylamide group, benzylhexylamide group, bistrimethylsilylamino group, bis-tert-butyldimethylsilylamino group, and phosphido group which is substituted with an alkyl group, and preferably, a dimethylamino group, diethylamino group, and diphenylamide group; and examples of the mercapto group of 1 to 20 carbon atoms may include methyl mercaptan, ethyl mercaptan, propyl mercaptan, isopropyl mercaptan, 1-butyl mercaptan, and isopentyl mercaptan, and preferably, ethyl mercaptan and isopropyl mercaptan.

E is a nitrogen atom or C—$R^{10}$, in which $R^{10}$ may be a hydrogen atom; a halogen atom, such as fluorine, chlorine, bromine, or iodine atoms; a linear or nonlinear alkyl group of 1 to 20 carbon atoms, such as a methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, or n-eicosyl group, and preferably, a methyl group, ethyl group, n-propyl group, isopropyl group, n-butyl group, or tert-butyl group; an alkyl group of 1 to 20 carbon atoms substituted with one or more halogen atoms, such as a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, or perbromoeicosyl group, and preferably, a trifluoromethyl group; a silyl group including a linear or nonlinear alkyl group of 1 to 20 carbon atoms, such as a methylsilyl group, ethylsilyl group, phenylsilyl group, dimethylsilyl group, diethylsilyl group, diphenylsilyl group, trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyldimethylsilyl group, tri-n-pentylsilyl group, tri-n-hexylsilyl group, tricyclohexylsilyl group, or triphenylsilyl group, and preferably a trimethylsilyl group, tert-butyldimethylsilyl group, or triphenylsilyl group; an aryl group of 6 to 30 carbon atoms, such as a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, biphenyl group, fluorenyl group, triphenyl group, naphthyl group, or anthracenyl group, and preferably, a phenyl group, naphthyl group, biphenyl group, 2-isopropylphenyl group, 3,5-xylyl group, or 2,4,6-trimethylphenyl group; an arylalkyl group of 7 to 30 carbon atoms, such as a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, or anthracenylmethyl group, and preferably, a benzyl group; an alkoxy group including a linear or nonlinear alkyl group of 1 to 20 carbon atoms, such as a methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, or n-eicosoxy group, and preferably, a methoxy group, ethoxy group, isopropoxy group, or tert-butoxy group; a siloxy group substituted with an alkyl group of 1 to 20 carbon atoms or an aryl group of 6 to 20 carbon atoms, such as a trimethylsiloxy group, triethylsiloxy group, tri-n-propylsiloxy group, triisopropylsiloxy group, tri-n-butylsiloxy group, tri-sec-butylsiloxy group, tri-tert-butylsiloxy group, tri-isobutylsiloxy group, tert-butyldimethylsiloxy group, tri-n-pentylsiloxy group, tri-n-hexylsiloxy group, tricyclohexylsiloxy group, or triphenylsiloxy group, and preferably, a trimethylsiloxy group, tert-butyldimethylsiloxy group, or triphenylsiloxy group; an amido group or a phosphido group including a hydrocarbon group of 1 to 20 carbon atoms, such as a dimethylamino group, diethylamino group, di-n-propylamino group, diisopropylamino group, di-n-butylamino group, di-sec-butylamino group, di-tert-butylamino group, diisobutylamino group, tert-butylisopropylamino group, di-n-hexylamino group, di-n-octylamino group, di-n-decylamino group, diphenylamino group, dibenzylamide group, methylethylamide group, methylphenylamide group, benzylhexylamide group, bistrimethylsilylamino group, bis-tert-butyldimethylsilylamino group, or phosphido group which is substituted with an alkyl group, and preferably, a dimethylamino group, diethylamino group, or diphenylamide group; or a mercapto group of 1 to 20 carbon atoms, such as methyl mercaptan, ethyl mercaptan, propyl mercaptan, isopropyl mercaptan, 1-butyl mercaptan, and isopentyl mercaptan, and preferably, ethyl mercaptan and isopropyl mercaptan.

X may be a halogen atom, such as fluorine, chlorine, bromine, or iodine atoms; an alkyl group of 1 to 20 carbon atoms, which is not a cyclopentadiene derivative, such as a methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, or n-eicosyl group, and preferably, a methyl group, ethyl group, isopropyl group, tert-butyl group, or amyl group; an arylalkyl group of 7 to 30 carbon atoms, such as a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, or anthracenylmethyl group, and preferably, a benzyl group; an alkoxy group of 1 to 20 carbon atoms, such as a methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, or n-eicosoxy group, and preferably, a methoxy group, ethoxy group, isopropoxy group, or tert-butoxy group; a siloxy group substituted with an alkyl group of 3 to 20 carbon atoms, such as a trimethylsiloxy group, triethylsiloxy group, tri-n-propylsiloxy group, triisopropylsiloxy group, tri-n-butylsiloxy group, tri-sec-butylsiloxy group, tri-tert-butylsiloxy group, tri-isobutylsiloxy group, tert-butyldimethylsiloxy group, tri-n-pentylsiloxy group, tri-n-hexylsiloxy group, tricyclohexylsiloxy group, or triphenylsiloxy group, and preferably, a trimethylsiloxy group, tert-butyldimethylsiloxy group, or triphenylsiloxy group; or an amido group or a phosphido group including a hydrocarbon group of 1 to 20 carbon atoms, such as a dimethylamino group, diethylamino group, di-n-propylamino group, diisopropylamino group, di-n-butylamino group, di-sec-butylamino group, di-tert-butylamino group, diisobutylamino group, tert-butylisopropylamino group, di-n-hexylamino group, di-n-octylamino group, di-n-decylamino group, diphenylamino group, dibenzylamide group, methylethylamide group, methylphenylamide group, benzylhexylamide group, bistrimethylsilylamino group, bis-tert-butyldimethylsilylamino group, or phosphido group, which is substituted with an alkyl group, and preferably, a dimethylamino group, diethylamino group, or diphenylamide group.

Meanwhile, in order to use the transition metal catalyst, represented by Formula 1 above, as an active catalyst component which is used to produce an ethylene homopolymer or copolymers of ethylene and olefins, an X ligand is extracted from a transition metal complex to convert the central metal into cations, and aluminoxane compounds or boron compounds which are capable of acting as opposite ions having weak bonding strength, that is, anions, are used along with a cocatalyst.

As is well known in the art, aluminoxane, which is represented by Formula 2 or 3 below, is frequently used as the aluminoxane compound in the present invention.

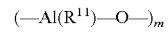  [Formula 2]

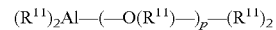  [Formula 3]

In the above Formulae, $R^{11}$ is an alkyl group of 1 to 20 carbon atoms, and preferably, is a methyl group, an isobutyl group, or a mixture in which the two groups are mixed at a predetermined ratio, and m and p are integers ranging from 5 to 20.

When an aluminoxane cocatalyst is used in order to use the transition metal catalyst of the present invention as an active catalyst, the mixing ratio of the transition metal catalyst and the cocatalyst is preferably set so that the molar ratio of the central metal to aluminum ranges from 1:20 to 1:10,000, and more preferably, 1:50 to 1:5,000.

Further, a boron compound which can be used as a cocatalyst in the present invention may be selected from compounds represented by Formulae 4 to 6 below, as disclosed in U.S. Pat. No. 5,198,401.

  [Formula 4]

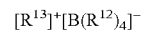  [Formula 5]

  [Formula 6]

In the above Formulae, B is a boron atom; $R^{12}$ is an unsubstituted phenyl group, or a phenyl group which is substituted with 3 to 5 substituent groups selected from the group consisting of an alkyl group of 1 to 4 carbon atoms which is substituted or unsubstituted with a fluorine atom and an alkoxy group of 1 to 4 carbon atoms which is substituted or unsubstituted with the fluorine atom; $R^{13}$ is an aromatic cation of 5 to 7 carbon atoms or an alkyl-substituted aromatic cation, for example, a triphenylmethyl cation; Z is a nitrogen atom or a phosphorus atom; $R^{14}$ is an alkyl radical of 1 to 4 carbon atoms or an anilinium radical which is substituted with two alkyl groups of 1 to 4 carbon atoms along with a nitrogen atom; and q is an integer of 2 or 3.

Examples of the boron-based cocatalyst may include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-tetrafluorophenyl)borate, tetrakis(2,2,4-trifluorophenyl)borate, phenyl bis(pentafluorophenyl)borate, and tetrakis(3,5-bistrifluoromethylphenyl)borate. Further, combination examples of the boron-based cocatalyst may include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluoromethylphenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, and tri(dimethylphenyl)phosphonium tetrakis(pentafluorophenyl)borate, and preferably, N,N-dimethylanilinium tetrakis(pentafluorophenyl)borate, triphenylmethylinium tetrakis(pentafluorophenyl)borate, and tris(pentafluoro)borane.

In a catalyst system using the boron-based cocatalyst, the molar ratio of the central metal to the boron atom may be 1:0.01~1:100, and preferably, 1:0.5~1:5.

Meanwhile, if necessary, a mixture of the boron compound and an organic aluminum compound or a mixture of the boron compound and the aluminoxane compound may be used. In connection with this, the aluminum compound is used to remove polar compounds, which act as a catalytic poison, from a reaction solvent, and may act as an alkylating agent if X of the catalyst components is halogen.

The organic aluminum compound is represented by Formula 7 below.

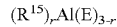

$(R^{15})_r Al(E)_{3-r}$ [Formula 7]

In the above Formula, $R^{15}$ is an alkyl group of 1 to 8 carbon atoms, E is a hydrogen atom or a halogen atom, and r is an integer ranging from 1 to 3.

Specifically, examples of the organic aluminum compound may include trialkylaluminum, such as trimethylaluminum, triethylaluminum, tripropylaluminum, triisobutylaluminum, and trihexylaluminum; dialkylaluminum chloride, such as dimethylaluminum chloride, diethylaluminum chloride, dipropylaluminum chloride, diisobutylaluminum chloride, and dihexylaluminum chloride; alkylaluminum dichloride, such as methylaluminum dichloride, ethylaluminum dichloride, propylaluminum dichloride, isobutylaluminum dichloride, and hexylaluminum dichloride; and dialkylaluminum hydride, such as dimethylaluminum hydride, diethylaluminum hydride, dipropylaluminum hydride, diisobutylaluminum hydride, and dihexylaluminum hydride. Here, trialkylaluminum is preferable, and triethylaluminum and triisobutylaluminum are more preferable.

In connection with this, the molar ratio of the central metal: the boron atom:the aluminum atom may be 1:0.1-100:2-1000, and preferably, 1:0.5-5:5-500.

In a method of producing ethylene polymers using the transition metal catalyst system according to another aspect of the present invention, the transition metal catalyst, the cocatalyst, and ethylene or a vinyl-based comonomer come into contact with each other in the presence of a predetermined organic solvent. In this case, the transition metal catalyst and the cocatalyst are separately introduced into a reactor, or are introduced into the reactor after they are first mixed with each other. The mixing conditions, such as the order of introduction, temperature, concentration, and the like, are not particularly limited.

The organic solvent which can be used in the method includes hydrocarbons of 3 to 20 carbon atoms, and specific examples of the organic solvent may include butane, isobutane, pentane, hexane, heptane, octane, isooctane, nonane, decane, dodecane, cyclohexane, methylcyclohexane, benzene, toluene, xylene, and the like.

Specifically, when the ethylene homopolymer is produced, the pressure of ethylene in a reactor is 1~1000 atm, and preferably, 5~150 atm. Further, the polymerization temperature is 30° C.~300° C., and preferably, 60° C.~250° C.

In addition, when copolymers of ethylene and olefins are produced, olefins of 3 to 18 carbon atoms may be used as comonomers along with ethylene, and specifically, may be selected from the group consisting of propylene, 1-butene, 1-pentene, 4-methyl-1-pentene, 1-hexene, 1-octene, 1-decene, 1-dodecene, 1-hexadecene, 1-octadecene, and vinylcyclohexane. More preferably, propylene, 1-butene, 1-hexene, 1-octene, 1-decene or vinylcyclohexane may be copolymerized with ethylene. In connection with this, the preferable pressure of ethylene in the reactor and the polymerization temperature are the same as in the method of producing an ethylene homopolymer. The ethylene copolymers produced using the method according to the present invention include 50 wt % or more of ethylene, and preferably, 60 wt % or more of ethylene. Linear low density polyethylene (LLDPE), which is produced using α-olefin of 4 to 10 carbon atoms as the comonomer, has a density of 0.910~0.940 g/cc, and, in connection with this, it is possible to produce very or ultra low density polyethylene (VLDPE or ULDPE) having a density of 0.910 g/cc or less.

Further, at the time of producing the ethylene homopolymer or copolymers according to the present invention, hydrogen may be used as a molecular weight controlling agent to control the molecular weight thereof, and the ethylene homopolymer or copolymers generally have a weight average molecular weight (Mw) of 50,000~500,000 g/mol.

Since the catalyst system of the present invention is homogeneous in a polymerization reactor, it is preferred that the catalyst system be applied to a solution polymerization process which is conducted at a temperature equal to or higher than the melting point of the polymer to be produced. However, as disclosed in U.S. Pat. No. 4,752,597, the transition metal catalyst and the cocatalyst may be supported by a porous metal oxide supporter so as to be used in a slurry polymerization process or a gaseous polymerization process as a heterogeneous catalyst system.

Mode for Invention

A better understanding of the present invention may be obtained through the following examples which are set forth to illustrate, but are not to be construed as the limit of the present invention.

The synthesis of all ligands and catalysts was conducted using a standard Schlenk or globe box technology in a nitrogen atmosphere if not particularly noted otherwise. The organic solvents used in the reactions were refluxed in the presence of sodium metal and benzophenone to remove moisture, and distilled immediately before they were used. $^1$H-NMR analyses of the produced ligands and catalysts were carried out at room temperature using Varian Oxford 300 MHz. The molecular weight of the synthesized catalyst compound was measured with Quattro micro MS, manufactured by Micromass Corp., using an ionization source in APCI-mode at a direct effusion flow rate of 20 mL/min.

Cyclohexane, serving as a polymerization solvent, was passed through a column in which a molecular sieve 5A and activated alumina were packed, and was bubbled using highly pure nitrogen to sufficiently remove moisture, oxygen, and other catalytic poison materials, and was then used. The resulting polymers were analyzed using the following methods.

1. Melt Index (MI)
Measurement was conducted based on ASTM D 2839.
2. Density
Measurement was conducted using a density gradient column based on ASTM D 1505.
3. Molecular Weight and Molecular Weight Distribution
Measurement was conducted using PL210 GPC which was provided with PL Mixed-BX2+preCol in a 1,2,3-trichlorobenzene solvent at 135° C. and a flow rate of 1.0 mL/min, and the molecular weight was compensated using a PL polystyrene standard material.
4. α-Olefin Content of Copolymer (wt %)
Measurement was conducted using a Bruker DRX500 nuclear magnetic resonance spectroscope at 125 MHz in a mixed solvent of 1,2,4-trichlorobenzene/$C_6D_6$ (⅞ weight fraction) at 120° C. in a $^{13}$C-NMR mode (Reference Document: Randal, J. C. JMS-Rev. Macromol. Chem. Phys. 1980, C29, 201).

PREPARATION EXAMPLE 1

N-phenylbiphenyl-2-amine

Trisdibenzylideneacetonedipalladium (0.276 g, 0.3 mmol) and tri-tert-butylphosphine (0.121 g, 0.6 mmol) were put into a flask, and then dissolved in 40 mL of toluene. Subsequently, 2-biphenylamine (2.53 g, 15 mmol), bromobenzene (2.36 g, 15 mmol) and tert-butoxy sodium (2.16 g, 22.5 mmol) were added into the flask, and then refluxed at a temperature of 110° C. for 12 hours. After cooling the flask including the reactant mixture to room temperature, the reactant mixture was washed using an ammonium chloride aqueous solution (150 mL) to separate an organic layer. The separated organic layer was washed with distilled water three times, and was then dried with magnesium sulfate. Thereafter, residues from which volatile components were removed at reduced pressure were purified using a silica gel chromatography tube in a mixed solvent of hexane and ethylacetate (1:10) to produce 3.51 g of colorless N-phenylbiphenyl-2-amine liquid.

Yield: 95%, $^1$H-NMR (CDCl$_3$) δ=6.91-7.06 (m, 6H), 7.20-7.45 (m, 8H) ppm

IR: $n_{NH}$=3402 cm$^{-1}$

Synthesis of (N-phenylbiphenyl-2-amido)(pentamethylcyclopentadienyl)titanium(IV)dichloride N-phenylbiphenyl-2-amine (0.61 g, 2.5 mmol) was dissolved in 100 mL of normal hexane, normal butyllithium (2.5M hexane solution, 1.3 mL) was slowly added thereto at a temperature of −78° C., and then the reactant mixture was stirred at room temperature for 3 hours. After the reaction finished, a white solid, which was obtained by removing hexane from the reaction product and washing it using the hexane, was dissolved in 50 mL of toluene, and then a solution in which (pentamethylcyclopentadienyl)titanium(IV) trichloride (0.56 g, 2.0 mol) was dissolved in 5 mL of toluene was slowly dropped thereinto at a temperature of −78° C., and then refluxed for 12 hours. After the reaction finished, the reaction product, from which volatile materials were removed, was washed using purified pentane, recrystallized at a temperature of −35° C., filtered, and then dried at a reduced pressure to produce 0.3 g of a reddish brown solid component.

Yield: 30%, $^1$H-NMR ($C_6D_6$) δ=1.86 (s, 15H), 6.82-7.25 (m, 14H) ppm

Mass (APCI mode, m/z): 497

PREPARATION EXAMPLE 2

Synthesis of bis(N-phenylbiphenyl-2-amido)(pentamethylcyclopentadienyl)titanium(IV)chloride N-phenylbiphenyl-2-amine (1.35 g, 5.5 mmol), produced in Preparation Example 1, was dissolved in 100 mL of normal hexane, normal butyllithium (2.5 M hexane solution, 2.6 mL) was slowly added thereto at a temperature of −78° C., and then the reactant mixture was stirred at room temperature for 3 hours. After the reaction finished, a white solid, which was obtained by removing hexane from the reaction product and washing it using the hexane, was dissolved in 50 mL of toluene, and then a solution in which (pentamethylcyclopentadienyl)titanium(IV)trichloride (0.56 g, 2.0 mol) was dissolved in 5 mL of toluene was slowly dropped thereinto at a temperature of −78° C., and then refluxed for 12 hours. After the reaction finished, the reaction product, from which volatile materials were removed, was washed using purified pentane, recrystallized at a temperature of −35° C., filtered, and then dried at reduced pressure to produce 0.4 g of reddish brown solid component.

Yield: 28%, $^1$H-NMR ($C_6D_6$) δ=1.79 (s, 15H), 6.68-7.48 (m, 28H) ppm

Mass (APCI mode, m/z): 705

PREPARATION EXAMPLE 3

N-(biphenyl-2-yl)naphthalene-1-amine

Trisdibenzylideneacetonedipalladium (0.276 g, 0.3 mmol) and tri-tert-butylphosphine (0.121 g, 0.6 mmol) were put into a flask, and then dissolved in 40 mL of toluene. Subsequently, 2-biphenylamine (2.53 g, 15 mmol), 1-bromonaphthalene (3.11 g, 15 mol) and tert-butoxy sodium (2.16 g, 22.5 mmol) were added into the flask, and then refluxed at a temperature of 110° C. for 12 hours. After the flask including the reactant mixture was cooled to room temperature, the reactant mixture was washed using an ammonium chloride aqueous solution (150 mL) to separate an organic layer. The separated organic layer was washed with distilled water three times, and was then dried with magnesium sulfate. Thereafter, residues from which volatile components were removed at reduced pressure were purified using a silica gel chromatography tube in a mixed solvent of hexane and ethylacetate (1:10), and were then recrystallized in normal hexane to produce 2.88 g of N-(biphenyl-2-yl)naphthalene-1-amine.

Yield: 65%, $^1$H-NMR (CDCl$_3$) δ=6.96-7.62 (m, 14H), 7.87-7.91 (m, 2H) ppm

Mass (APCI mode, m/z): 295

Synthesis of (N-(biphenyl-2-yl)naphthalene-1-amido)(pentamethylcyclopentadienyl)titanium(IV) dichloride N-(biphenyl-2-yl)naphthalene-1-amine (0.74 g, 2.5 mmol) was dissolved in 100 mL of normal hexane, normal butyllithium (2.5 M hexane solution, 1.3 mL) was slowly added thereto at a temperature of −78° C., and then the reactant mixture was stirred at room temperature for 3 hours. After the reaction finished, a white solid, which was obtained by removing hexane from the reaction product and washing it using the hexane, was dissolved in 50 mL of toluene, and then a solution in which (pentamethylcyclopentadienyl)titanium(IV)trichloride (0.56 g, 2.0 mol) was dissolved in 5 mL of toluene was slowly dropped thereinto at a temperature of −78° C., and then refluxed for 12 hours. After the reaction finished, the reaction product, from which volatile materials were removed, was washed using purified pentane, recrystallized at a temperature of −35° C., filtered, and then dried at reduced pressure to produce 0.38 g of black solid component.

Yield: 35%, $^1$H-NMR (C$_6$D$_6$) δ=1.85 (s, 15H), 6.65-8.15 (m, 16H) ppm

Mass (APCI mode, m/z): 548

PREPARATION EXAMPLE 4 dibiphenyl-2-yl amine

Trisdibenzylideneacetonedipalladium (0.276 g, 0.3 mmol) and tri-tert-butylphosphine (0.121 g, 0.6 mmol) were put into a flask, and then dissolved in 40 mL of toluene. Subsequently, 2-biphenylamine (2.53 g, 15 mmol), 2-bromobiphenyl (3.50 g, 15 mmol) and tert-butoxy sodium (2.16 g, 22.5 mmol) were added into the flask, and then refluxed at a temperature of 110° C. for 12 hours. After the flask including the reactant mixture was cooled to room temperature, the reactant mixture was washed using an ammonium chloride aqueous solution (150 mL) to separate an organic layer. The separated organic layer was washed with distilled water three times, and was then dried with magnesium sulfate. Thereafter, residues from which volatile components were removed at reduced pressure were purified using a silica gel chromatography tube in a mixed solvent of hexane and ethylacetate (1:10), and were then recrystallized in normal hexane to produce 3.42 g of dibiphenyl-2-yl amine.

Yield: 71%, $^1$H-NMR (CDCl$_3$) δ=6.96-7.04 (m, 2H), 7.19-7.48 (m, 16H) ppm

IR: n$_{NH}$=3401 cm$^{-1}$

Synthesis of (dibiphenyl-2-ylamido)(pentamethylcyclopentadienyl)titanium(IV)dichloride Dibiphenyl-2-yl amine (0.80 g, 2.5 mmol) was dissolved in 100 mL of normal hexane, a normal butyllithium (2.5 M hexane solution, 1.3 mL) was slowly added thereto at a temperature of −78° C., and then the reactant mixture was stirred at room temperature for 3 hours. After the reaction finished, a white solid, which was obtained by removing hexane from the reaction product and washing it using the hexane, was dissolved in 50 mL of toluene, and then a solution in which (pentamethylcyclopentadienyl)titanium(IV)trichloride (0.56 g, 2.0 mmol) was dissolved in 5 mL of toluene was slowly dropped thereinto at a temperature of −78° C., and then refluxed for 12 hours. After the reaction finished, the reaction product, from which volatile materials were removed, was washed using purified pentane, recrystallized at a temperature of −35° C., filtered, and then dried at reduced pressure to produce 0.38 g of a reddish brown solid component.

Yield: 32%, $^1$H-NMR (C$_6$D$_6$) δ=1.88 (s, 15H), 6.57-7.21 (m, 18H) ppm

Mass (APCI mode, m/z): 590

PREPARATION EXAMPLE 5

N-(2'-methoxyphenyl)biphenyl-2-amine

Trisdibenzylideneacetonedipalladium (0.276 g, 0.3 mmol) and tri-tert-butylphosphine (0.121 g, 0.6 mmol) were put into a flask, and then dissolved in 40 mL of toluene. Subsequently, 2-biphenylamine (2.53 g, 15 mmol), 1-bromo-2-methoxybenzene (2.81 g, 15 mmol) and tert-butoxy sodium (2.16 g, 22.5 mmol) were added into the flask, and then refluxed at a temperature of 110° C. for 12 hours. After cooling the flask including the reactant mixture to room temperature, the reactant mixture was washed using an ammonium chloride aqueous solution (150 mL) to separate an organic layer. The separated organic layer was washed with distilled water three times, and was then dried with magnesium sulfate. Thereafter, residues from which volatile components were removed at reduced pressure were purified using a silica gel chromatography tube in a mixed solvent of hexane and ethylacetate (1:10), and were then recrystallized in normal hexane to produce 3.39 g of N-(2'-methoxyphenyl)biphenyl-2-amine.

Yield: 82%, $^1$H-NMR (CDCl$_3$) δ=3.77 (s, 3H), 6.87-7.09 (m, 4H), 7.28-7.452 (m, 9H) ppm IR: n$_{NH}$=3400 cm$^{-1}$ Synthesis of (N-(2'-methoxyphenyl)biphenyl-2-amido)pentamethylcyclopentadienyl)titanium(IV) dichloride N-(2'-methoxyphenyl)biphenyl-2-amine (0.69 g, 2.5 mmol) was dissolved in 100 mL of normal hexane, normal butyllithium (2.5 M hexane solution, 1.3 mL) was slowly added thereto at a temperature of −78° C., and then the reactant mixture was stirred at room temperature for 3 hours. After the reaction finished, a white solid, which was obtained by removing hexane from the reaction product and washing it using the hexane, was dissolved in 50 mL of toluene, and then a solution in which (pentamethylcyclopentadienyl)titanium (IV)trichloride (0.56 g, 2.0 mmol) was dissolved in 5 mL of toluene was slowly dropped thereinto at a temperature of −78° C., and then refluxed for 12 hours. After the reaction finished, the reaction product, from which volatile materials were removed, was washed using purified pentane, recrystallized at a temperature of −35° C., filtered, and then dried at reduced pressure to produce 0.38 g of reddish brown solid component.

Yield: 36%, $^1$H-NMR (C$_6$D$_6$) δ==1.89 (s, 15H), 3.62 (s, 3H), 6.15-7.52 (m, 13H) ppm Mass (APCI mode, m/z): 528

EXAMPLE 1

300 mL of cyclohexane was put into a stainless steel reactor having a volume of 500 mL, which was purged with nitrogen after sufficient drying, and then 1.0 mL of modified methylaluminoxane-7 (manufactured by Akzo Nobel Corp., modified MAO-7, 7 wt % Al Isopar solution) (100 mM toluene solution) was added to the stainless steel reactor. Thereafter, the reactor was heated to a temperature of 140° C., and then 0.2 mL of (N-phenylbiphenyl-2-amido)(pentamethylcyclopentadienyl)titanium(IV)dichloride (5 mM toluene solution), produced in Preparation Example 1, and 0.3 mL of triphenylmethylinium tetrakis(pentafluorophenyl)borate (99%, Boulder Scientific) (5 mM toluene solution) were sequentially added thereto. Subsequently, ethylene was injected into the reactor until the pressure in the reactor was 30 kg/cm$^2$, and was then continuously supplied thereinto for polymerization. 3 min after the reaction started, the maximum temperature of the reactor reached 160° C. 10 min after the reaction started, 10 mL of ethanol, including 10 vol % hydrochloric acid aqueous solution, was added to finish the polymerization, and the reaction product was stirred for 4 hours along with 1500 mL of additional ethanol, filtered, and then separated. The separated reaction product was dried n a vacuum oven at 60° C. for 8 hours to produce 9.2 g of polymer. It was impossible to measure the melt index of the polymer. The polymer had a weight average molecular weight (Mw) of 350,000 g/mol and a molecular weight distribution (Mw/Mn) of 3.2, as determine through gel chromatography analysis.

EXAMPLE 2

Polymerization was conducted using the same method as in Example 1, except that polymerization initiation temperature was 80° C. The maximum temperature of the reactor reached 121° C., and 22.0 g of polymer was produced. It was impossible to measure the melt index of the polymer. The polymer had a weight average molecular weight (Mw) of 410,000 g/mol and a molecular weight distribution (Mw/Mn) of 3.9, as determined through gel chromatography analysis.

EXAMPLE 3

Polymerization was conducted using the same method as in Example 2, except that the bis(N-phenylbiphenyl-2-amido)(pentamethylcyclopentadienyl)titanium(IV)chloride produced in Preparation Example 2 was used as a catalytic component. The maximum temperature of the reactor reached 163° C., and 10.3 g of polymer was produced. It was impossible to measure the melt index of the polymer. The polymer had a weight average molecular weight (Mw) of 396,000 g/mol and a molecular weight distribution (Mw/Mn) of 3.2, as determined through gel chromatography analysis.

EXAMPLE 4

Polymerization was conducted using the same method as in Example 1, except that (N-phenylbiphenyl-2-yl-)naphthalene-1-amido(pentamethylcyclopentadieny)titanium(IV) dichloride produced in Preparation Example 3 was used as a catalytic component. The maximum temperature of the reactor reached 159° C., and 9.5 g of polymer was produced. It was impossible to measure the melt index of the polymer. The polymer had a weight average molecular weight (Mw) of 456,000 g/mol and a molecular weight distribution (Mw/Mn) of 2.8, as determined through gel chromatography analysis.

EXAMPLE 5

Polymerization was conducted using the same method as in Example 1, except that (dibiphenyl-2-yl-amido) (pentamethylcyclopentadienyl)titanium(IV)dichloride produced in Preparation Example 4 was used as a catalytic component. The maximum temperature of the reactor reached 166° C., and 12.4 g of polymer was produced. It was impossible to measure the melt index of the polymer. The polymer had a weight average molecular weight (Mw) of 372,000 g/mol and a molecular weight distribution (Mw/Mn) of 2.3, as determined through gel chromatography analysis.

EXAMPLE 6

Polymerization was conducted using the same method as in Example 1, except that (N-(2'-methoxyphenyl)biphenyl-2-amido)(pentamethylcyclopentadienyl)titanium(IV)dichloride, produced in Preparation Example 5, was used as a catalytic component. The maximum temperature of the reactor reached 166° C., and 10.4 g of polymer was produced. It was impossible to measure the melt index of the polymer. The polymer had a weight average molecular weight (Mw) of 350,000 g/mol and a molecular weight distribution (Mw/Mn) of 2.5, as determined through gel chromatography analysis.

EXAMPLE 7

The copolymerization of ethylene and 1-octene was conducted using a high-temperature continuous polymerization apparatus. All reactants, including a catalyst, a reaction solvent, and monomers, were continuously injected into a reactor having a volume of 420 mL using a quantitative pump, and the removal of unreacted monomers and solvent and the collection of the polymerized products were also continuously conducted. Cyclohexane was used as a polymerization solvent. Ethylene was supplied into a reactor at a flow rate of 0.5 kg/hr, 1-octene was supplied thereinto at a flow rate of 0.14 kg/hr, and the total flow rate of the solution was 5.0 kg/hr. The reactor was maintained at a pressure of 110 kg/cm$^2$ and a temperature of 150° C. As a catalyst, (N-phenylbiphenyl-2-amido)(pentamethylcyclopentadienyl)titanium(IV)dichloride (0.7 mM toluene solution), produced in Preparation Example 1, was injected into the reactor at a flow rate of 75 mmol Ti/hr, as a cocatalyst, triphenylmethyliniumtetrakispentafluorophenylborate (99%, Boulder Scientific) (3.2 mM toluent solution) was injected thereinto, and, as an agent for removing impurities from the reactor and alkylating a catalyst, modified methylaluminoxane-3A (Akzo Nobel Corp., modified MAO-3A, 7 wt % Al Isopar solution) (31.5 mM toluene solution) was injected thereinto at a flow rate of 0.60 mmol/hr after it had been brought into contact with the catalyst. Pallagonic acid was added to a reaction product flowing out from the reactor at a flow rate of 5.2 mmol/hr to deactivate the catalyst, and then unreacted monomers and solvent were removed therefrom to yield a polymer. The conversion ratio of ethylene was 92%, and the activity of the catalyst was 7.9 kg-PE/mmol-Ti, as measured through gas chromatography. As the result of analysis of the polymer, the polymer was found to have a melt index of 0.6 g/10 min and a density of 0.906 g/cc. Further, the polymer had a 1-octene content of 11.3 wt %, and a weight average molecular weight of 92,000 g/mol and a molecular weight distribution (Mw/Mn) of 2.37, as determined through gel chromatography analysis.

EXAMPLE 8

The copolymerization of ethylene and 1-octene was conducted using the same method as in Example 7, except that bis(N-phenylbiphenyl-2-amido)(pentamethylcyclopentadienyl)titanium(IV)chloride (0.7 mM toluene solution), produced in Preparation Example 2, was used at a flow rate of 65 mmol Ti/hr. The conversion ratio of ethylene was 93%, and the activity of the catalyst was 9.8 kg-PE/mmol-Ti. As the result of analysis of the polymer, the polymer was found to have a melt index of 1.4 g/10 min and a density of 0.9035 g/cc. Further, the polymer was found to have a 1-octene content of 12.5 wt %, a weight average molecular weight of 78,600 g/mol and a molecular weight distribution (Mw/Mn) of 2.33, as determined through gel chromatography analysis.

EXAMPLE 9

The copolymerization of ethylene and 1-octene was conducted using a batch polymerization apparatus as follows.

300 mL of cyclohexane and 5 mL of 1-octene were put into a stainless steel reactor, having a volume of 500 mL, which was purged with nitrogen after sufficient drying, and then 1.5 mL of modified methylaluminoxane-7 (manufactured by Akzo Nobel Corp., modified MAO-7, 7 wt % Al Isopar solution ((100 mM toluene solution) was added to the stainless steel reactor. Thereafter, the reactor was heated to a temperature of 140° C., and then 0.2 mL of (N-(biphenyl-2-yl)naphthalene-s-amido)(pentamethylcyclopentadienyl)titanium(IV)dichloride (5 mM toluene solution), produced in Preparation Example 3, and 0.3 mL of triphenylmethylinium tetrakis(pentafluorophenyl)borate (99%, Boulder Scientific) (5 mM toluene solution) were sequentially added thereto. Subsequently, ethylene was injected into the reator until the pressure in the reactor was 30kg/cm², and was then continuously supplied thereinto for polymerization. 1 min after the reaction started, the maximum temperature of the reactor reached 164° C. 1 min after the reaction started, 10 mL of ethanol, including 10 vol % hydrochloric acid aqueous solution, was added to finish the polymerization, and the reaction product was stirred for 4 hours along with 1500 mL of additional ethanol, filtered and then separated. The separated reaction product was dried n a vacuum over at 60° C. for 8 hours to produce 8.8 g of polymer. The polymer had a melt index of 0.197 and a density of 0.9126 g/cc. Further, the polymer had a weight average molecular weight (Mw) of 159,000 g/mol and a molecular weight distribution (Mw/Mn) of 2.5, as determined through gel chromatography analysis.

EXAMPLE 10

Polymerization was conducted using the same method as in Example 9, except that (dibiphenyl-2-yl amido)(pentamethylcyclopentadienyl)ptitanium(IV)dichloride, produced in Preparation Example 4, was used as a catalytic component. The maximum temperature of the reactor reached 162° C., and 7.1 g of polymer was produced. The polymer had a melt index of 0.058 and a density of 0.9126 g/cc. Further, the polymer had a weight average molecular weight (Mw) of 203,000 g/mol and a molecular weight distribution (Mw/Mn) of 2.3, as determined through gel chromatography analysis.

EXAMPLE 11

Polymerization was conducted using the same method as in Example 9, except that (N-(2'methoxyphenyl)biphenyl-2-amido)(pentamethylcyclopentadienyl)titanium(IV)dichloride, produced in Preparation Example 5, was used as a catalytic component. The maximum temperature of the reactor reached 154° C., and 4.5 g of polymer was produced. The polymer had a melt index of 2.19 and a density of 0.9118 g/cc. Further, the polymer had a weight average molecular weight (Mw) of 68,000 g/mol and a molecular weight distribution (Mw/Mn) of 2.4, as determined through gel chromatography analysis.

COMPARATIVE EXAMPLE 1

Polymerization was conducted using the same method as in Example 1 except that 0.2 mL of (trichloro)(pentamethylcyclopentadienyl(titanium(IV) (97%, Strem) (5 mM toluene solution) was used as a catalytic component, thereby producing 4.5 g of polymer. The polymer had a melt index of 0.16 g/10 min. Further, the polymer had a weight average molecular weight (Mw) of 150,000 g/mol and a molecular weight distribution (Mw/Mn) of 5.5, as determined through gel chromatography analysis.

COMPARATIVE EXAMPLE 2

The copolymerization of ethylene and 1-octene was conducted using the same method as in Example 7 except that (trimethyl)(pentamethylcyclopentadienyl)titanium(IV) (97%, Strem) (5 mM toluene solution) was used at a flow rate of 150 mmol Ti/hr, triphenylmethyliniumtetrakispentafluorophenylborate (99%, Boulder Scientific) (3.2 mM toluene solution) was used at a flow rate of 300 mmol/hr, and modified methylaluminoxane-3A (Akzo Nobel Corp., modified MAO-3A, and 7 wt % Al Isopar solution) (31.5 mM toluene) was used at a flow rate of 0.50 mmol/hr. The conversion ratio of ethylene was 95%, and the activity of the catalyst was 4.3 kg-PE/mmol-Ti. The polymer had a melt index of 1.06 g/10 min and a density of 0.905 g/cc.

COMPARATIVE EXAMPLE 3

Polymerization was conducted under the same conditions as in Comparative Example 1 except that 0.2 mL of rac-dimethylsilylbis(2-methylindenyl)zirconium dichloride (Boulder Scientific) (5 mM toluene solution) was used as a catalytic component. The product was dried to produce 15.0 g of polymer. The polymer had a melt index of 110 g/10 min. Further, the polymer had a weight average molecular weight (Mw) of 28,000 g/mol and a molecular weight distribution (Mw/Mn) of 12.0, as determined through gel chromatography analysis.

TABLE 1

| | Polymerization initiation temperature (° C.) | Polymer (g) | Melt Index (g/10 min) | Mw (g/mol) | Mw/Mn |
|---|---|---|---|---|---|
| Example 1 | 140 | 9.2 | — | 350,000 | 3.4 |
| Example 2 | 80 | 22.0 | — | 410,000 | 3.9 |
| Example 3 | 80 | 10.3 | — | 396,000 | 3.2 |
| Example 4 | 140 | 9.5 | — | 456,000 | 2.8 |
| Example 5 | 140 | 12.4 | — | 372,000 | 2.3 |
| Example 6 | 140 | 10.4 | — | 350,000 | 2.5 |
| Comparative Example 1 | 140 | 4.5 | 0.160 | 150,000 | 5.5 |
| Comparative Example 3 | 140 | 15.0 | 110.0 | 28,000 | 12.0 |

TABLE 2

|  | Example 7 | Example 8 | Comparative Example 2 |
|---|---|---|---|
| Flow rate of transition metal catalyst (mmol Ti/hr) | 75 | 65 | 150 |
| Flow rate of cocatalyst (mmol/hr) | 150 | 150 | 300 |
| Flow rate of MMAO (mmol/hr) | 0.60 | 0.60 | 0.50 |
| Ethylene conversion ratio (%) | 92 | 93 | 95 |
| Catalytic activity (kg-PE/mmol-Ti) | 7.9 | 9.8 | 4.3 |
| Melt Index (g/10 min) | 0.6 | 1.4 | 1.06 |
| Density (g/cc) | 0.906 | 0.9035 | 0.905 |

Table 1 shows the results obtained by performing a polymerization process in a batch stainless steel reactor, and Table 2 shows the results obtained by copolymerizing ethylene and 1-octene using a high-temperature continuous polymerization reactor.

As can be seen in Table 1 and Table 2, in Examples 1 and 4 to 6, polymers having a weight average molecular weight larger than that in Comparative Examples 1 and 3 were produced at a small molecular weight distribution even at a high temperature (140° C.), and in Examples 7 and 8, the same ethylene conversion ratios as those in Comparative Example 2 were obtained even though half the amount of conventional catalyst used in Comparative Example 2 was used in Examples 7 and 8.

As described above, although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of producing an ethylene homopolymer at a polymerization temperature of 60~250° C. using the transition metal system comprising;

(a) a transition metal catalyst system;
represented by Formula 1 below, which includes a cyclopentadiene derivative and one or more anionic ligands having an aryl group substituted with an aryl derivative at an ortho-position thereof around a transition metal, the ligands not being crosslinked to each other:

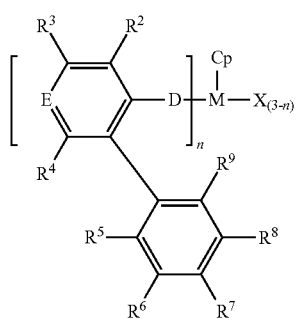

[Formula 1]

wherein M is titanium;
Cp is cyclopentadienyl or pentamethylcyclopentadienyl group which forms a η5-bond with the central metal M;
D is N—$R^1$, in which $R^1$ is a hydrogen atom or an aryl group of 6 to 30 carbon atoms;
$R^2$, $R^3$, and $R^4$ are a hydrogen atom;
$R^5$, $R^6$, $R^7$, $R^8$ and $R^9$ are each independently a hydrogen atom, a linear or nonlinear alkyl group of 1 to 20 carbon atoms, an aryl group of 6 to 30 carbon atoms, or an alkoxy group selected from a methoxy group, ethoxy group, isopropoxy group, and tert-butoxy group, and $R^5$, $R^6$, $R^7$, $R^8$ and $R^9$ may be arbitrarily bonded with each other to form rings;
E is C—$R^{10}$, in which $R^{10}$ is a hydrogen atom;
n is an integer of 1 or 2; and
X is a halogen atom or an alkyl group of 1 to 20 carbon atoms (b) an aluminoxane and/or a boron compound as a cocatalyst,
when the cocatalyst is aluminoxane, the molar ratio of the central metal M to aluminum atom of aluminoxane is 1:50~1:5,000; when the cocatalyst is boron compound, the molar ratio of the central metal M to boron atom of the boron compound is 1:0.01~1:100; and when the cocatalyst is a mixture of aluminoxane and boron compound, the molar ratio of the central metal M: boron atom of the boron compound: aluminum atom of the aluminoxane is 1:0.5~5:5~500.

2. The method of producing an ethylene homopolymer according to claim 1, wherein, at the time of polymerizing ethylene monomers, a pressure of ethylene monomers in a reactor is 5~150 atm.

3. A method of producing an ethylene-olefin copolymer at a polymerization temperature of 60~250° C. using the transition metal system comprising;

(a) a transition metal catalyst system;
represented by Formula 1 below, which includes a cyclopentadiene derivative and one or more anionic ligands having an aryl group substituted with an aryl derivative at an ortho-position thereof around a transition metal, the ligands not being crosslinked to each other:

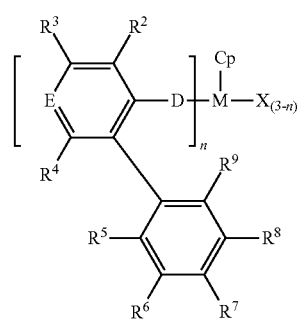

[Formula 1]

wherein M is titanium;
Cp is cyclopentadienyl or pentamethylcyclopentadienyl group which forms a $\eta^5$-bond with the central metal M;
D is N—$R^1$, in which $R^1$ is a hydrogen atom or an aryl group of 6 to 30 carbon atoms:
$R^2$, $R^3$, and $R^4$ are a hydrogen atom;
$R^5$, $R^6$, $R^7$, $R^8$ and $R^9$ are each independently a hydrogen atom, a linear or nonlinear alkyl group of 1 to 20 carbon atoms, an aryl group of 6 to 30 carbon atoms, or an alkoxy group selected from a methoxy group, ethoxy group, isopropoxy group, and tert-butoxy group, and $R^5$, $R^6$, $R^7$, $R^8$ and $R^9$ may be arbitrarily bonded with each other to form rings;
E is C—$R^{10}$, in which $R^{10o}$ is a hydrogen atom;
n is an integer of 1 or 2; and
X is a halogen atom or an alkyl group of 1 to 20 carbon atoms;

(b) an aluminoxane and/or a boron compound as a cocatalyst, when the cocatalyst is aluminoxane, the molar ratio of the central metal M to aluminum atom of aluminoxane is 1:50~1:5,000; when the cocatalyst is boron compound, the molar ratio of the central metal M to boron atom of the boron compound is 1:0.01~1:100; and when the cocatalyst is a mixture of aluminoxane and boron compound, the molar ratio of the central metal M: boron atom of the boron compound: aluminum atom of the aluminoxane is 1:0.5~5:5~500.

4. The method of producing an ethylene-olefin copolymer according to claim 3, wherein an olefin co-monomer which is used to conduct polymerization along with ethylene is one or more selected from the group consisting of propylene, 1-butene, 1-hexene, 1-octene, 1-decene, and vinylcyclohexane, and an amount of ethylene in the copolymer is 60 wt % or more.

5. The method of producing an ethylene-olefin copolymer according to claim 3, wherein a pressure of ethylene monomers in a reactor is 5~150 atm.

6. The method of producing an ethylene homopolymer according to claim 1, wherein the cocatalyst is methyl aluminoxane.

7. The method of producing an ethylene homopolymer according to claim 1, wherein the boron compound is selected from the group consisting of N,N-dimethylanilinium tetrakispentafluorophenylborate and triphenylmethylinium tetrakispentafluorophenylborate.

8. The method of producing an ethylene homopolymer according to claim 1, wherein the organic alkyl aluminum is triethyl aluminum or triisobutyl aluminum.

9. The method of producing an ethylene-olefin copolymer according to claim 3, wherein the cocatalyst is methyl aluminoxane.

10. The method of producing an ethylene-olefin copolymer according to claim 3, wherein the boron compound is selected from the group consisting of N,N-dimethylanilinium tetrakispentafluorophenylborate and triphenylmethylinium tetrakispentafluorophenylborate.

11. The method of producing an ethylene-olefin copolymer according to claim 3, wherein the organic alkyl aluminum is triethyl aluminum or triisobutyl aluminum.

* * * * *